US012576420B2

(12) United States Patent
Hashigami et al.

(10) Patent No.: US 12,576,420 B2
(45) Date of Patent: Mar. 17, 2026

(54) ATOMIZING APPARATUS FOR FILM FORMATION AND FILM FORMING APPARATUS USING THE SAME

(71) Applicants: SHIN-ETSU CHEMICAL CO., LTD., Tokyo (JP); Kochi Prefectural Public University Corporation, Kochi (JP)

(72) Inventors: Hiroshi Hashigami, Annaka (JP); Toshiyuki Kawaharamura, Nankoku (JP)

(73) Assignees: SHIN-ETSU CHEMICAL CO., LTD, Tokyo (JP); KOCHI PREFECTURAL PUBLIC UNIVERSITY CORPORATION, Kochi (JP)

( * ) Notice: Subject to any disclaimer, the term of this patent is extended or adjusted under 35 U.S.C. 154(b) by 572 days.

(21) Appl. No.: 17/801,485

(22) PCT Filed: Feb. 18, 2021

(86) PCT No.: PCT/JP2021/006048
§ 371 (c)(1),
(2) Date: Aug. 22, 2022

(87) PCT Pub. No.: WO2021/172154
PCT Pub. Date: Sep. 2, 2021

(65) Prior Publication Data
US 2022/0410199 A1 Dec. 29, 2022

(30) Foreign Application Priority Data
Feb. 27, 2020 (JP) ................................ 2020-032307

(51) Int. Cl.
*B05B 17/06* (2006.01)

(52) U.S. Cl.
CPC .................................. *B05B 17/06* (2013.01)

(58) Field of Classification Search
CPC ......... H01L 21/02628; H01L 21/02175; C23C 16/4486; B05B 17/06; B05B 17/0669
See application file for complete search history.

(56) References Cited

U.S. PATENT DOCUMENTS 3,901,443 A * 8/1975 Mitsui ................ B05B 17/0615 239/338
2009/0133713 A1 5/2009 Ohmi et al.
(Continued)

FOREIGN PATENT DOCUMENTS

CN 108472676 A 8/2018
CN 110769941 A 2/2020
(Continued)

OTHER PUBLICATIONS

Jun. 29, 2021 Office Action issued in Japanese Patent Application No. 2021-016942.
(Continued)

*Primary Examiner* — Joseph A Miller, Jr.
(74) *Attorney, Agent, or Firm* — OLIFF PLC.

(57) ABSTRACT

An atomizing apparatus for film formation enabling high-quality thin film formation with suppressed particle adhesion, including: a raw-material container accommodating a raw-material solution; a cylindrical member connecting inside the raw-material container to an outer unit, and disposed so a lower end of the cylindrical member does not touch a liquid surface of the raw-material solution in the container; an ultrasound generator having at least one source emitting ultrasound; and a liquid tank where the ultrasound propagates the raw-material solution through a middle solution. The generation source is outside the liquid tank and has a center between a plane extending from an inner side wall of the raw-material container and a plane extending from an outer side wall of the cylindrical member. A center line of an ultrasound-emitting surface of the ultrasound generation
(Continued)

source is designated as u, wherein the center line u does not intersect the cylindrical member side wall.

4 Claims, 3 Drawing Sheets

(56) References Cited

U.S. PATENT DOCUMENTS

| | | | |
|---|---|---|---|
| 2011/0147482 | A1 | 6/2011 | Matsuura |
| 2016/0158788 | A1 | 6/2016 | Orita et al. |
| 2018/0326436 | A1 | 11/2018 | Li |
| 2020/0171514 | A1 | 6/2020 | Li |

FOREIGN PATENT DOCUMENTS

| | | | |
|---|---|---|---|
| JP | H10-140356 | A | 5/1998 |
| JP | 2005-305233 | A | 11/2005 |
| JP | 4813115 | B2 | 11/2011 |
| JP | 2013-028480 | A | 2/2013 |
| JP | 2014-063973 | A | 4/2014 |
| JP | 2016-187764 | A | 11/2016 |
| JP | 2017-069424 | A | 4/2017 |
| JP | 2018-070422 | A | 5/2018 |
| JP | 2018-142637 | A | 9/2018 |
| JP | 2020-188170 | A | 11/2020 |
| JP | 2020-196930 | A | 12/2020 |
| WO | 2009/013951 | A1 | 1/2009 |
| WO | 2015/019468 | A1 | 2/2015 |

OTHER PUBLICATIONS

Apr. 27, 2021 Search Report issued in Interntaional Patent Application No. PCT/JP2021/006048.

Aug. 30, 2022 International Preliminary Report on Patentability issued in International Patent Application No. PCT/JP2021/006048.

Feb. 26, 2024 Office Action Issued in Chinese Patent Application No. 202180016328.0.

Mar. 13, 2024 Extended European Search Report issued in European Patent Application No. 21760747.2.

Aug. 15, 2023 Office Action issued in Chinese Patent Application No. 202180016328.0.

May 27, 2025 Office Action issued in Korean Patent Application No. 10-2022-7029172.

* cited by examiner

[FIG. 1]
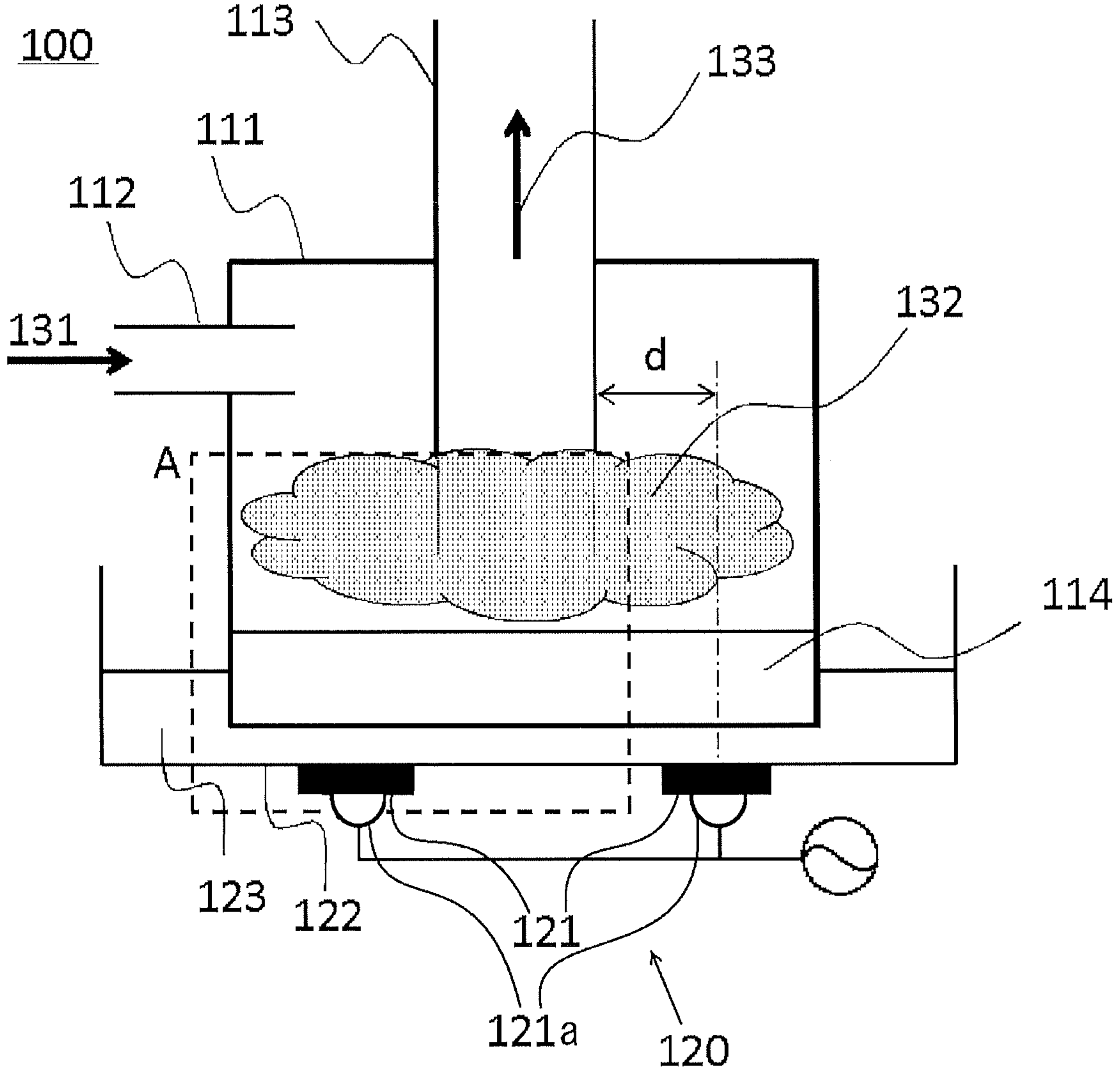

[FIG. 2]
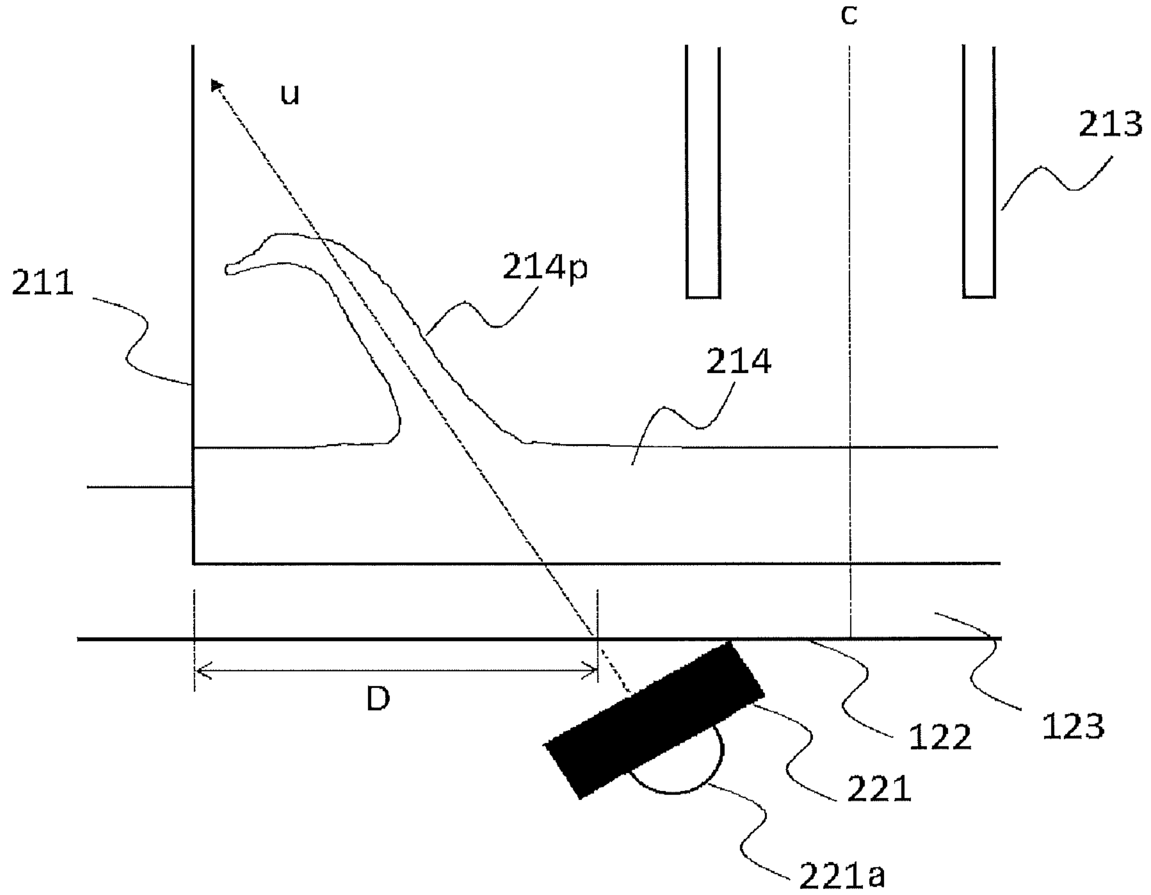
[FIG. 3]
300
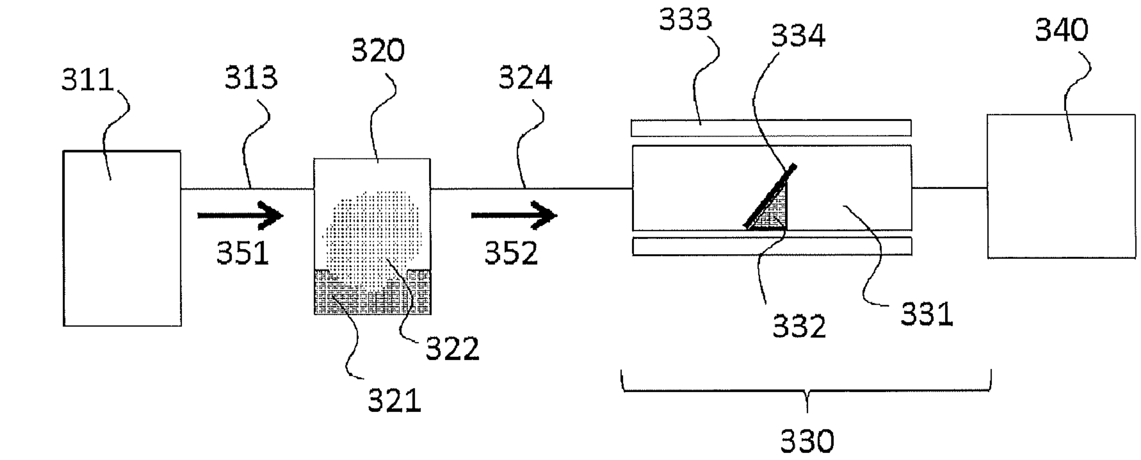

[FIG. 4]
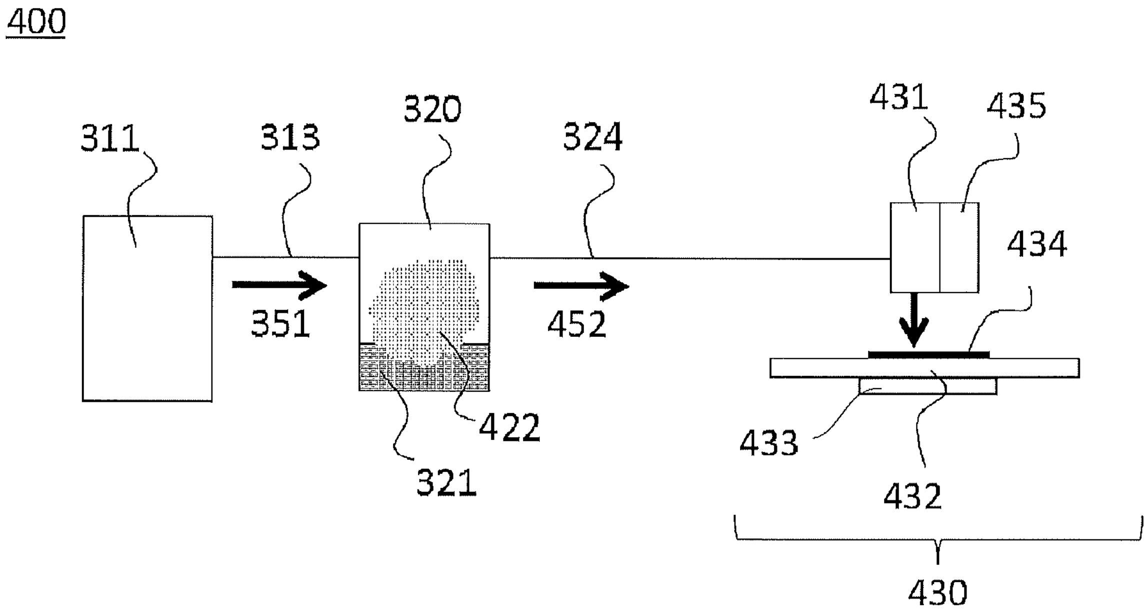

ATOMIZING APPARATUS FOR FILM FORMATION AND FILM FORMING APPARATUS USING THE SAME

TECHNICAL FIELD

The present invention relates to an atomizing apparatus for film formation and a film forming apparatus using the atomizing apparatus.

BACKGROUND ART

Mist Chemical Vapor Deposition (Mist CVD. Hereinafter, also referred to as "mist CVD method") has been developed in which a thin film is formed on a substrate by using a raw material atomized into a mist form. This method has been utilized to prepare oxide semiconductor film etc. (Patent Document 1, 2). In film formation according to the mist CVD method, mist is obtained with ultrasound as a general technique.

CITATION LIST

Patent Literature

Patent Document 1: JP 2013-028480 A
Patent Document 2: JP 2014-063973 A

SUMMARY OF INVENTION

Technical Problem

However, a method for atomizing a raw material to form high-quality film has not been established yet, and there is a problem that numerous particles reflecting the raw-material mist quality adhere to the prepared film. Moreover, it is known that when the film-formation speed is increased, for example, if mist is supplied in larger amount, such particles adhere more noticeably. It has been desired to achieve both high film quality and productivity.

The present invention has been made to solve the above problems. An object of the present invention is to provide: an atomizing apparatus for film formation which enables efficient formation of a high-quality thin film with particle adhesion suppressed; and a film forming apparatus for forming a high-quality film in high productivity by using this atomizing apparatus.

Solution to Problem

The present invention has been made to achieve the object, and provides an atomizing apparatus for film formation, comprising:

- a raw-material container configured to accommodate a raw-material solution;
- a cylindrical member configured to spatially connect inside of the raw-material container to an outer unit, and disposed such that a lower end of the cylindrical member does not touch a liquid surface of the raw-material solution in the raw-material container;
- an ultrasound generator having at least one ultrasound generation source configured to emit ultrasound; and
- a liquid tank where the ultrasound propagates to the raw-material solution through a middle solution, wherein
- the ultrasound generation source is located outside the liquid tank,
- the ultrasound generation source has a center between a plane extending from an inner side wall of the raw-material container and a plane extending from an outer side wall of the cylindrical member, and
- provided that a center line of an ultrasound-emitting surface of the ultrasound generation source is designated as u, the ultrasound generation source is provided such that the center line u does not intersect the side wall of the cylindrical member.

Such an atomizing apparatus for film formation makes it possible to stably obtain favorable, high-quality and high-density mist, which is suitable for film formation. Thus, the atomizing apparatus for film formation enables efficient formation of high-quality film with fewer particles.

In this case, the ultrasound generation source is preferably provided such that a distance d between the outer wall of the cylindrical member and a straight line which passes through the center of the ultrasound generation source and is parallel to the outer wall of the cylindrical member is 5 mm or more.

In this manner, mist with higher density can be obtained more stably.

In addition, the present invention provides a film forming apparatus comprising at least:

- an atomizer configured to atomize a raw-material solution to form a raw-material mist; and
- a film-forming unit configured to supply the mist to a substrate to form a film on the substrate, wherein the film forming apparatus comprises the above-described atomizing apparatus for film formation as the atomizer.

Such an apparatus is capable of forming high-quality film with high productivity.

Advantageous Effects of Invention

As described above, the present invention makes it possible to provide an atomizing apparatus with which high-quality and high-density mist is stably obtained for film formation. Moreover, the present invention makes it possible to provide a film forming apparatus capable of forming high-quality film in high productivity.

BRIEF DESCRIPTION OF DRAWINGS

FIG. 1 is a diagram showing a configuration of an atomizing apparatus for film formation according to the present invention.

FIG. 2 is a diagram for explaining a mist generation section of the inventive atomizing apparatus for film formation.

FIG. 3 is a diagram for explaining one embodiment of a configuration of a film forming apparatus according to the present invention.

FIG. 4 is a diagram for explaining another embodiment of the configuration of the inventive film forming apparatus.

DESCRIPTION OF EMBODIMENTS

Hereinafter, the present invention will be described in detail, but the present invention is not limited thereto.

As noted above, there have been demands for: an atomizing apparatus for film formation which enables formation of high-quality thin film with particle adhesion suppressed; and a film forming apparatus for forming high-quality film in high productivity by using this atomizing apparatus.

The present inventors have earnestly studied the above problems and consequently found that high-quality thin films with suppressed particle adhesion can be formed in high productivity by using an atomizing apparatus for film formation, including: a raw-material container configured to accommodate a raw-material solution; a cylindrical member configured to spatially connect inside of the raw-material container to an outer unit, and disposed such that a lower end of the cylindrical member does not touch a liquid surface of the raw-material solution in the raw-material container; an ultrasound generator having at least one ultrasound generation source configured to emit ultrasound; and a liquid tank where the ultrasound propagates to the raw-material solution through a middle solution. In the atomizing apparatus for film formation, the ultrasound generation source is located outside the liquid tank, the ultrasound generation source has a center between a plane extending from an inner side wall of the raw-material container and a plane extending from an outer side wall of the cylindrical member, and provided that a center line of an ultrasound-emitting surface of the ultrasound generation source is designated as u, the ultrasound generation source is provided such that the center line u does not intersect the side wall of the cylindrical member. This finding has led to the completion of the present invention.

Hereinbelow, description will be given with reference to the drawings.

(Atomizing Apparatus for Film Formation)

FIG. 1 shows an atomizing apparatus 100 for film formation according to the present invention. The atomizing apparatus 100 for film formation includes: a raw-material container 111 configured to accommodate a raw-material solution 114; a cylindrical member 113 configured to spatially connect the inside of the raw-material container 111 to an outer unit, and disposed such that a lower end of the cylindrical member 113 does not touch a liquid surface of the raw-material solution 114 in the raw-material container 111; an ultrasound generator 120 having at least one ultrasound generation source (ultrasonic vibration plate) 121 configured to emit ultrasound; and a liquid tank 122, where ultrasound propagates to the raw-material solution 114 through a middle solution 123.

In the raw-material container 111, a carrier gas inlet 112 for entry of a carrier gas 131 is disposed. The shapes of the raw-material container 111 and the cylindrical member 113 are not particularly limited, but these members having columnar shape enable smooth flow of a gas mixture 133 of the carrier gas 131 and a mist 132. The carrier gas inlet 112 is preferably provided higher than the lower end of the cylindrical member 113 inside the raw-material container 111. In this manner, the carrier gas 131 and the mist 132 can be sufficiently mixed. Additionally, although unillustrated, the raw-material container 111 may include a mechanism for replenishing the raw-material solution 114 depending on the consumption.

The members constituting atomizing apparatus for film formation are not particularly limited, as long as the materials and structures are chemically stable with respect to the raw-material solution 114 and have sufficient mechanical strength. It is possible to utilize, for example, metal, plastic material, glass, metal materials whose surfaces are coated with plastic material, etc.

The ultrasound generator 120 includes at least the ultrasound generation source(s) 121. Moreover, an oscillator or the like provided to the ultrasound generator 120 can drive the ultrasound generation source 121. Meanwhile, the liquid tank 122 accommodates the middle solution 123 through which ultrasound emitted from the ultrasound generation source 121 is propagated to the raw-material solution 114. The ultrasound generation source 121 has an ultrasound-emission surface with a flat shape, and the emission direction may be fixed after inclining this emission surface, or may be adjustable by inclining the emission surface with an angle adjusting mechanism **121*a*. In addition, the ultrasound generation source 121 includes at least one ultrasonic vibration plate which may be a vibration plate alone or may be constituted in combination with means for controlling ultrasound emission direction. Moreover, the number of the ultrasound generation sources 121 to be provided may be one or more, depending on desired mist density, the size of the raw-material container 111, etc. The frequency of ultrasound emitted from the ultrasound generation source 121 is not limited, as long as the mist 132 to be generated has desired particle diameter and particle size. The frequency to be utilized may be, for example, 1.5 MHz to 4.0 MHz. Thereby, the raw-material solution 114** is formed into mist of droplets with a micron size, which is suitable for film formation.

Further, each ultrasound generation source 121 is disposed outside the liquid tank 122 such that the center of the ultrasound generation source 121 is located between a plane extending from an inner side wall of the raw-material container 111 and a plane extending from an outer side wall of the cylindrical member 113. A distance between the outer wall of the cylindrical member 113 and a straight line which passes through the center of the ultrasound generation source 121 and is parallel to the outer wall of the cylindrical member 113 is here designated as "d". The distance d is preferably 5 mm or more, more preferably 10 mm or more. This makes it possible to more stably obtain mist with higher concentration. Note that the upper limit value of "d" can be set within a range that is less than a distance between the outer wall of the cylindrical member 113 and the inner wall of the raw-material container 111. For example, "d" can be 100 mm or less.

The middle solution 123 accommodated in the liquid tank 122 is not particularly limited, as long as ultrasound is not inhibited. For example, water, an alcohol, an oil, and so forth may be used. The liquid tank 122 and the like are not particularly limited, as long as the materials and structures are chemically stable with respect to the middle solution 123 and have certain mechanical strength. It is possible to utilize, for example, metal, plastic material, glass, metal materials whose surfaces are coated with plastic material, etc. Additionally, although unillustrated, the liquid tank 122 may further include means for detecting and controlling the liquid amount and temperature of the middle solution 123.

FIG. 2 is a diagram for explaining a mist generation section of the inventive atomizing apparatus for film formation. FIG. 2 is an enlarged diagram corresponding to a section A of a dashed line frame in FIG. 1, and schematically showing a state near the liquid surface of the raw-material solution when ultrasound is emitted. A center line of an ultrasound-emitting surface of an ultrasound generation source 221 is designated as "u". When ultrasound is emitted from the ultrasound generation source 221 below a raw-material solution 214 in a direction of the center line u, a liquid column **214*p* is formed on the raw-material solution 214** along the ultrasound emission direction, and a mist is formed simultaneously.

In this event, the ultrasound generation source 221 is inclined with an angle adjusting mechanism **221*a* such that the center line u does not intersect the side wall of a cylindrical member 213. Meanwhile, the center line u and a line c passing through the center of the cylindrical member 213 may intersect at any point, or may form skew lines. Further, in this event, a distance D from the center of the ultrasound generation source 221 to a plane extending from a side wall of a raw-material container 211 is preferably such that the liquid column 214***p* is not significantly blocked by the side wall of the raw-material container 211. Thereby, the gas mixture is supplied to the outside of the atomizing apparatus for film formation without blocking the flow of the gas mixture, enabling more efficient film formation. Simultaneously, the gas mixture is prevented from mixing with droplets of relatively large particle diameter which possibly cause unreacted materials and particles. Consequently, film with higher quality can be formed. Incidentally, the descriptions of the same members as in FIG. 1 are omitted as appropriate.

Note that, in the present invention, the term "particle" refers to ones observed as particles when semiconductor film surface is observed, and includes ones incorporated in the film and integrated with the film and ones attached as foreign matter on the semiconductor film surface. Additionally, the particle diameter is a value based on the particle size measured with a particle measurement instrument according to light scattering. The particle size is determined through calibration of the measurement instrument with reference particles of multiple sizes. Specifically, the particle size is a classified value, and a measurement value of particles measured with a measurement instrument is compared with measurement values of reference particles having been measured. Particles on semiconductor film surface can be measured, for example, with a laser scattering-based particle counter.

(Film Forming Apparatus)

The present invention further provides a film forming apparatus which employs the atomizing apparatus for film formation described in FIGS. 1 and 2.

FIG. 3 is a diagram for explaining one embodiment of a configuration of the inventive film forming apparatus. The inventive film forming apparatus 300 includes at least: an atomizer 320 configured to atomize a raw-material solution 321 to form a raw-material mist 322; and a film-forming unit 330 configured to supply the mist 322 to a substrate 334 to form a film on the substrate 334. The film forming apparatus 300 includes, as the atomizer 320, the inventive atomizing apparatus 100 for film formation described with reference to FIG. 1 and FIG. 2. Further, a carrier-gas supplier 311, the atomizer 320, and the film-forming unit 330 are connected with pipes 313, 324.

The carrier-gas supplier 311 may be, for example, an air compressor, various gas cylinders or nitrogen gas separators, etc., and may include a mechanism for controlling the supply flow amount of gas.

The pipes 313, 324 are not particularly limited, as long as the pipes have sufficient stability with respect to the raw-material solution 321 and temperature near the film-forming unit 330 and so forth. It is possible to widely use pipes made of quartz or common resins, such as polyethylene, polypropylene, vinyl chloride, silicon resin, urethane resin, and fluorine resin.

Moreover, although unillustrated, another pipe from the carrier-gas supplier 311 bypassing the atomizer 320 may be connected to the pipe 324 so as to allow dilution-gas supply to a gas mixture 352.

Multiple atomizers 320 may be provided depending on the materials for film formation, etc. Moreover, in this case, gas mixtures 352 supplied from the multiple atomizers 320 to the film-forming unit 330 may be independently supplied to the film-forming unit 330, or may be mixed in the pipe 324 or another container for mixing (not shown) that is provided additionally.

The film-forming unit 330 may include a film forming chamber 331, a susceptor 332 disposed in the film forming chamber 331 and configured to hold the substrate 334 where a film is formed, and a heater 333 configured to heat the substrate 334.

The structure and so forth of the film forming chamber 331 are not particularly limited. For example, a metal such as aluminum and stainless steel may be employed, or quartz or silicon carbide may be employed when a film is formed at higher temperature.

The heater 333 can be selected depending on the materials and structures of the substrate 334, the susceptor 332 and the film forming chamber 331. For example, a resistance heating heater or a lamp heater is suitably used.

A carrier gas 351 is mixed with the mist 322 formed in the atomizer 320. The resulting gas mixture 352 is conveyed to the film-forming unit 330 to form a film.

Further, the inventive film forming apparatus may further include a discharge unit 340. The discharge unit 340 may be connected to the film-forming unit 330 with a pipe or the like, or may be disposed with a space in between. Moreover, the structure and configuration of the discharge unit 340 are not particularly limited, as long as the discharge unit 340 is made of a material that is stable with respect to heat, gas, and product discharged from the film-forming unit 330. It is possible to use known common exhaust fan or exhaust pump. Further, depending on the nature of the gas and product to be discharged, for example, a mist trap, a wet scrubber, a bag filter, a purifier, or the like may be installed.

FIG. 3 explains the embodiment of the film-forming unit 330 in which the substrate 334 is disposed inside the film forming chamber 331. Nevertheless, the inventive film forming apparatus is not limited thereto, and may be a film forming apparatus 400 as shown in FIG. 4. A nozzle 431 configured to eject a gas mixture 452 containing a mist 422 may be used as a film-forming unit 430 to directly blow the gas mixture 452 onto a substrate 434 disposed on a susceptor 432 for film formation.

In this case, a driver configured to drive one or both of the nozzle 431 and the susceptor 432 in a horizontal direction may be provided, so that a film is formed by changing relative positions of the substrate 434 and the nozzle 431 in the horizontal direction. Moreover, the susceptor 432 may include a heater 433 configured to heat the substrate 434. Further, the film-forming unit 430 may include a discharge unit 435. The discharge unit 435 may be integrated with the nozzle 431, or may be separately disposed. Note that the descriptions of the same members as in FIGS. 1 to 3 are omitted as appropriate.

EXAMPLE

Hereinafter, the present invention will be described in detail by showing Examples, but the present invention is not limited thereto.

Example 1

The atomizing apparatus for film formation shown in FIGS. 1 and 2 and the film forming apparatus shown in FIG. 3 were used to form an α-gallium oxide film.

In the atomizing apparatus for film formation, the raw-material container and cylindrical member used were both made of borosilicate glass, and a film forming chamber made of quartz was prepared. A gas cylinder filled with nitrogen gas was used to supply carrier gas. The gas cylinder and the atomizing apparatus for film formation were connected with a urethane resin tube, and the atomizing apparatus for film formation was further connected to the film forming chamber with a quartz pipe.

An aqueous solution containing 0.02 mol/L of gallium acetylacetonate was mixed with hydrochloric acid with a concentration of 34% such that the volume ratio of the latter was 1%. The mixture was stirred with a stirrer for 60 minutes to prepare a raw-material solution, and the raw-material container was filled therewith. The atomizing apparatus for film formation used had two ultrasonic vibration plates (frequency: 2.4 MHz, emission angle: 80°). Each ultrasonic vibration plate was disposed such that the center of the ultrasonic vibration plate was located 10 mm apart outwardly from the side wall of the cylindrical member, and the center line u did not intersect the side wall of the cylindrical member as in FIG. 2.

Next, a c-plane sapphire substrate with a thickness of 0.6 mm and a diameter of 4 inches (approximately 10 cm) was placed on a quartz susceptor disposed in the film forming chamber, and heated such that the substrate temperature reached 500° C.

Next, with the ultrasonic vibration plates, ultrasonic vibration was propagated through water to the precursor in the raw-material container to atomize the raw-material solution (mist was formed).

Next, a nitrogen gas was added to the raw-material container at a flow rate of 5 L/min. A gas mixture of the mist and the nitrogen gas was supplied to the film forming chamber for 60 minutes to form a film. Immediately thereafter, supplying the nitrogen gas was stopped, and supplying the gas mixture to the film forming chamber was stopped.

In the X-ray diffraction measurement, the peak appeared at 2θ=40.3°. This verified that the prepared crystal layer of the laminate was α-phase $Ga_2O_3$.

Then, the film thickness of the prepared film was measured by the light reflectance analysis, and the growth rate was calculated. Moreover, the concentration of particles (diameter: 0.5 μm or more) on the film was evaluated with a substrate inspector (KLA candela-CS10).

Example 2

A film was formed as in Example 1, except that the nitrogen gas flow rate was 10 L/min.

In the X-ray diffraction measurement, the peak appeared at 2θ=40.3°. This verified that the prepared crystal layer of the laminate was α-phase $Ga_2O_3$.

Then, the film was evaluated as in Example 1.

Example 3

An α-gallium oxide film was formed using the same apparatus and raw-material solution as those in Example 1, except the film forming apparatus used was the film forming apparatus shown in FIG. 4. A mist-ejecting nozzle made of quartz was used. An aluminum hot plate was used as the susceptor, and the substrate was heated to 450° C. Next, the susceptor was reciprocally driven in the horizontal direction at a speed of 10 mm/s below the mist-ejecting nozzle. Further, the gas mixture was supplied from the mist-ejecting nozzle to the substrate on the susceptor at 5 L/min for 60 minutes to form a film.

In the X-ray diffraction measurement, the peak appeared at 2θ=40.3°. This verified that the prepared crystal layer of the laminate was α-phase $Ga_2O_3$. Then, the film was evaluated as in Example 1.

Comparative Example 1

A film was formed as in Example 1, except that ultrasound was emitted toward the side wall of the cylindrical member.

In the X-ray diffraction measurement, the peak appeared at 2θ=40.3°. This verified that the prepared crystal layer of the laminate was α-phase $Ga_2O_3$. Then, the film was evaluated as in Example 1.

Comparative Example 2

A film was formed as in Example 2, except that ultrasound was emitted toward the side wall of the cylindrical member.

In the X-ray diffraction measurement, the peak appeared at 2θ=40.3°. This verified that the prepared crystal layer of the laminate was α-phase $Ga_2O_3$. Then, the film was evaluated as in Example 1.

Table 1 shows the growth rates and the particle concentrations of the films obtained in Examples 1, 2, 3 and Comparative Examples 1, 2.

TABLE 1

| | Growth rate [nm/min] | Particle concentration [the number of particles/cm$^2$] |
|---|---|---|
| Example 1 | 14.1 | 0.15 |
| Example 2 | 31.4 | 0.13 |
| Example 3 | 14.7 | 0.13 |
| Comparative Example 1 | 4.9 | 15.02 |
| Comparative Example 2 | 10.9 | 62.30 |

As can be seen from Table 1 and shown by Examples 1, 2, 3, the inventive film forming apparatuses were excellent and capable of forming high-quality films at high growth rate with fewer particles. In contrast, in Comparative Examples 1, 2 using the atomizing apparatus for film formation of the conventional technique, the growth rates were low, and a large number of particles adhered.

Example 4

A film was formed under the same conditions as in Example 1, except that the film-formation time, that is, the time during which the gas mixture of the mist and nitrogen gas was supplied to the film forming chamber, was 120 minutes. A semiconductor film having a film thickness of 1 μm or more was formed. Then, the concentration of particles (diameter: 0.3 μm or more) on the film surface obtained by the film formation was evaluated with a substrate inspector (KLA candela-CS10).

Example 5

A film was formed under the same conditions as in Example 2, except that the film-formation time was 120 minutes. The film was evaluated under the same conditions as in Example 4.

Example 6

A film was formed under the same conditions as in Example 3, except that the film-formation time was 120 minutes. The film was evaluated under the same conditions as in Example 4.

Comparative Example 3

A film was formed under the same conditions as in Comparative Example 1, except that the film-formation time was 120 minutes. The film was evaluated under the same conditions as in Example 4.

Comparative Example 4

A film was formed under the same conditions as in Comparative Example 2, except that the film-formation time was 120 minutes. The film was evaluated under the same conditions as in Example 4.

Table 2 shows the growth rates and the particle concentrations of the films obtained in Examples 4, 5, 6 and Comparative Examples 3, 4.

TABLE 2

| | Growth rate [nm/min] | Particle concentration [the number of particles/cm$^2$] |
|---|---|---|
| Example 4 | 13.8 | 0.15 |
| Example 5 | 30.5 | 0.13 |
| Example 6 | 15.2 | 0.13 |
| Comparative Example 3 | 4.5 | 70.02 |
| Comparative Example 4 | 11.2 | 112.10 |

As can be seen from Table 2 and shown by Examples 4, 5, 6, when the inventive film forming apparatuses were used for the film formation, high-quality films were successfully formed at high growth rate with fewer particles. Particularly, the semiconductor films were obtained such that the particle concentration with the diameter of 0.3 μm or more was 50/cm$^2$ or less. In contrast, in Comparative Examples 3, 4 using the atomizing apparatus for film formation of the conventional technique, the growth rates were low, and a large number of particles adhered.

It should be noted that the present invention is not limited to the above-described embodiments. The embodiments are just examples, and any embodiments that substantially have the same feature and demonstrate the same functions and effects as those in the technical concept disclosed in claims of the present invention are included in the technical scope of the present invention.

The invention claimed is:

1. An atomizing apparatus for film formation, comprising:

a raw-material container configured to accommodate a raw-material solution;

a cylindrical member configured to spatially connect inside of the raw-material container to an outer unit;

an ultrasound generator having at least one ultrasound generation source configured to emit ultrasound; and a liquid tank where the ultrasound propagates to the raw-material solution through a middle solution, wherein the ultrasound generation source is located outside the liquid tank, the ultrasound generation source has a center between a plane extending from an inner side wall of the raw-material container and a plane extending from an outer side wall of the cylindrical member, provided that a center line of an ultrasound-emitting surface of the ultrasound generation source is designated as u, the ultrasound generation source is provided such that the center line u does not intersect the side wall of the cylindrical member and the center line u intersects the side wall of the raw-material container, and a carrier gas inlet is provided higher than the lower end of the cylindrical member inside the raw-material container.

2. The atomizing apparatus for film formation according to claim 1, wherein the ultrasound generation source is provided such that a distance d between the outer wall of the cylindrical member and a straight line which passes through the center of the ultrasound generation source and is parallel to the outer wall of the cylindrical member is 5 mm or more.

3. A film forming apparatus comprising at least:

an atomizer configured to atomize a raw-material solution to form a raw-material mist; and a film-forming unit configured to supply the mist to a substrate to form a film on the substrate, wherein the atomizer is the atomizing apparatus according to claim 1.

4. A film forming apparatus comprising at least:

an atomizer configured to atomize a raw-material solution to form a raw-material mist; and a film-forming unit configured to supply the mist to a substrate to form a film on the substrate, wherein the atomizer is the atomizing apparatus according to claim 2.

* * * * *